C. E. STARR.
SPRING HANGER FOR AUTOMOBILES.
APPLICATION FILED APR. 7, 1920.
1,383,579.
Patented July 5, 1921.
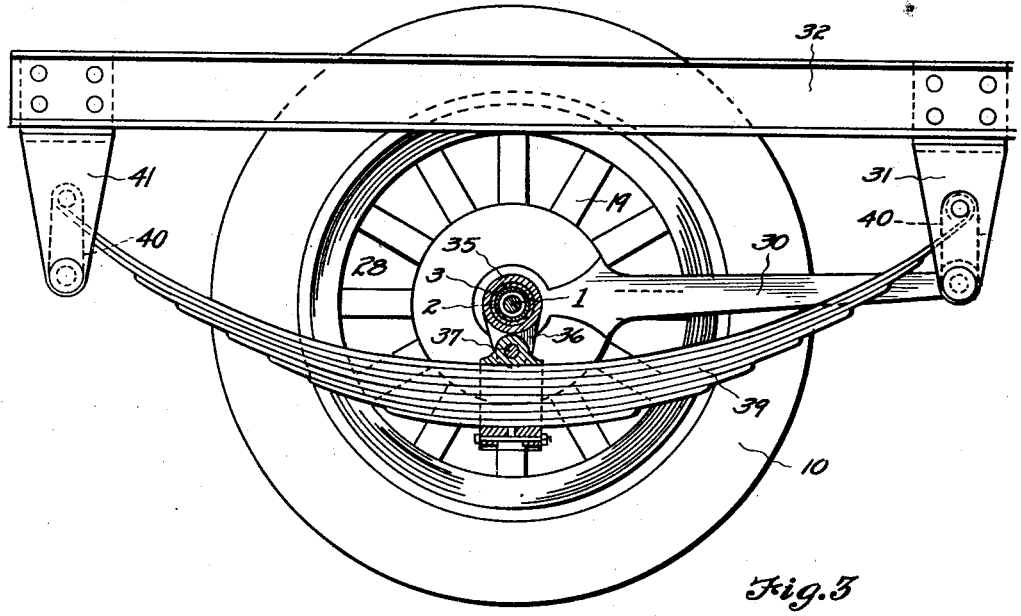
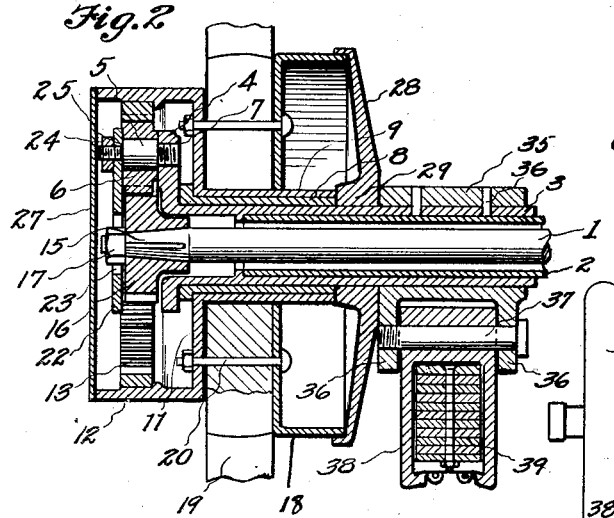
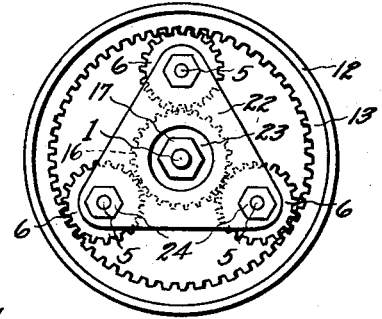
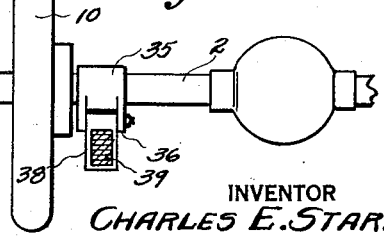
INVENTOR
CHARLES E. STARR
BY
Richard J. Cook
ATTORNEY

UNITED STATES PATENT OFFICE.

CHARLES E. STARR, OF BELLINGHAM, WASHINGTON, ASSIGNOR TO PERFECTO GEAR DIFFERENTIAL CO., OF BELLINGHAM, WASHINGTON, A CORPORATION OF WASHINGTON.

SPRING-HANGER FOR AUTOMOBILES.

1,383,579.  Specification of Letters Patent.  Patented July 5, 1921.

Application filed April 7, 1920. Serial No. 371,816.

*To all whom it may concern:*

Be it known that I, CHARLES E. STARR, a citizen of the United States, and resident of Bellingham, Whatcom county, State of Washington, have invented certain new and useful Improvements in Spring-Hangers for Automobiles, of which the following is a specification.

This invention relates to improvements in spring hangers for automobiles, or similar motor driven vehicles, and more particularly to spring hangers of a particular character which serve, through the intermediacy of spring members, to support a load or vehicle body, from the housing of the driving axle of the vehicle.

The principal object of the invention is to provide spring suspending members which, used in connection with a certain type of wheel driving gearing, will permit the center of gravity of a load, as supported from the driving axle of a vehicle, to be automatically moved forwardly or rearwardly of the supporting axle to assist in driving the vehicle wheels over ruts or obstructions in the roadway.

In accomplishing this and other objects of the invention, I have provided the improved details of structure, the preferred forms of which are illustrated in the accompanying drawings, wherein—

Figure 1 is an inside elevation of a vehicle driving wheel and a part of the vehicle body frame, with spring suspending members attached thereto, according to the present invention.

Fig. 2 is a view in vertical section, of a vehicle wheel hub and driving gearing, with a spring suspending member and spring, mounted according to the present invention.

Fig. 3 is an outside face view of the planetary driving gears.

Fig. 4 is a diagrammatic illustration of a spring suspended from the ordinary vehicle axle housing.

Referring more in detail to the drawings: 1 designates a section of a differential driving axle of a motor vehicle, which is rotatably contained within a non-rotatable axle housing 2 of well known form. Mounted rotatably upon the outer end of the housing is a sleeve 3, provided at its outer end with a triangular flange 4 to which are secured three equidistant bearing pins 5 upon which are mounted pinions 6. The pins 5 are preferably mounted in the flange by being threaded thereinto, as is shown at 7, and the pinions are the intermediate gears of a planetary gear system, presently disclosed.

An annular bushing 8 is disposed upon the sleeve adjacent the flange 4 to form a bearing for an annular member 9 that constitutes the inner portion of the hub of the vehicle wheel 10.

The member 9 is flanged, as at 11, and terminates in an outwardly extending drum flange 12 that forms a housing for the gearing mechanism, and wherein an internally toothed gear ring 13, that meshes with the pinions 6, is fixedly mounted.

The axle 1 is of the full floating type and is provided at its outer end with a tapered portion 15 upon which a gear wheel 16 is keyed and is locked by a nut 17 threaded onto the end of the shaft. The gear 16 travels in mesh with the pinions 6 and is the central gear of the planetary system, and when rotated by the shaft, acts upon the pinions 6 to rotate the wheel.

A brake drum 18 is located on the inner side of the wheel in such a manner that the spokes 19 of the wheel may be inserted between the drum and flange portion 11, and the two tightened securely together by bolts 20 to form a rigid wheel structure.

22 is a triangular plate having a central recess 23 to accommodate the nut 17 and provided at three points with suitable holes that fit over the outer ends of the bearing pins 5, so that, when nuts 24 are threaded onto the ends of the pins, the plate 22 will be forced against shoulders 25 of the pins to effect a rigid support for the pinions 6.

The outer end of the gear housing 12 may be closed by a plate 27, and the housing may be filled with grease or oil, so that the gear will always be thoroughly lubricated when in use, and the brake drum is provided with a cover plate 28 provided with a hub 29 that revolubly contains the sleeve 3, and has a forwardly extending arm 30 formed therewith, that is pivotally fixed at its end to the lower end of a depending bracket 31, mounted on the side beam 32 of the vehicle body frame or chassis.

Fixedly mounted on the sleeve 3, just inside the drum cover 28, by means of pins 34, is a collar 35 which has two spaced apart arms 36 depending therefrom, and pivotally suspended between these arms by means of a pivot pin 37, is a shackle 38, wherein a leaf spring 39 is centrally mounted.

The spring 39 curves upwardly and at its ends is pivotally attached to the upper ends of links 40, which, at their lower ends, are pivotally fixed to the bracket 31 forwardly of the wheel 10 and a similar bracket 41 rearwardly thereof.

With the parts constructed and assembled as described, in operation, the axle 1 is driven to revolve the gear 16, which, through the intermediacy of the pinions 6, drives the gear ring 13 to turn the hub and wheel.

Since the collar 35 is secured to the sleeve 3 and the spring 39 is supported by the collar, it is impossible for the sleeve to rotate, but a limited distance, yet there is a tendency for it to do so when driving power is exerted through the pinions 6. If the vehicle is being driven forwardly there is a tendency for the collar 35 to be rotated with the sleeve 3 to carry the spring 39 bodily forward, and when the vehicle is being driven rearwardly, there is the same tendency, which is normally overcome by the weight of the vehicle body applied to the arms 36, to carry the spring rearwardly.

From this it will be understood that should the vehicle wheel, when traveling forward, strike a rut or obstruction which would require extra power to carry it over, this extra power applied and the resistance the wheel offers to moving over the obstruction, will cause the sleeve 3 to rotate in a manner that will swing the arms 36 of the collar 35 forwardly and thereby move the spring 39 forwardly. Since the load is supported by the spring, through the pivoted links 40 which permit such movement of the spring, this forward movement of the spring causes the center of gravity of the load, as supported by the wheels, to be moved forwardly accordingly, and in this manner carries the load over or more nearly over, the obstruction with the load thus moved forwardly, an appreciable weight is relieved from the wheels which permits them to be more easily driven over the obstruction. Similar action takes place when the vehicle is moving in a rearward direction.

While I have described the spring suspending members as used in connection with the driving gearing illustrated in Figs. 2 and 3, it is apparent that such members and springs could be used on ordinary types of motor vehicles, as is shown in Fig. 4 with the same effect, provided that the usual torque arms or other device for retaining the axle housing against rotation, were removed, and the housing left free to rotate a limited amount, which would cause the rearward and forward shifting of the supporting springs.

What I claim as new is:

1. In a vehicle of the class described, the combination with a longitudinal frame member, a ground wheel, a driving axle for the wheel, a housing for the axle, driving mechanism for the wheel which, in operation, tends to rotate the housing oppositely to the direction of the wheel and means for substantially preventing movement of the wheel axle longitudinally with respect to the frame, of a suspending member fixed to the housing to turn therewith, a spring pivotally supported by said member, means for supporting the frame member from the spring and permitting longitudinal shifting of the spring relative to the frame in accordance with the movement of the suspending member.

2. In a vehicle of the class described, the combination with a longitudinal frame member, a ground wheel, a driving axle for the wheel, a housing for the axle, driving mechanism for the wheel mounted on the housing which in operation tends to rotate the housing oppositely to the direction of the wheel and means for preventing movement of the wheel longitudinally of the frame, of a suspending member fixed to the housing to rotate therewith, a shackle pivotally suspended from said member, a spring mounted centrally in said shackle and extending longitudinally with the frame, links pivotally connected with the ends of the spring and to members fixed on the frame to permit longitudinal movement of the spring with respect to the frame in accordance with the movement of the shackle forwardly or rearwardly of the axle.

3. In a vehicle of the class described, the combination with a longitudinal frame member, a ground wheel, a driving axle for the wheel, a housing for the axle, driving mechanism for the wheel mounted on the housing which in operation tends to rotate the housing oppositely to the direction of the wheel of downwardly extending brackets fixed to the frame member forwardly and rearwardly of the wheel, an arm pivotally fixed at its opposite ends to the axle housing and to one of said brackets to retain the wheel against longitudinal movement with respect to the frame, a collar fixed on the housing to rotate therewith and having arms depending therefrom, a shackle pivotally suspended from the arms, a spring centrally mounted in said shackle, with its opposite ends adjacent the frame brackets and links pivotally fixed at their opposite ends to said brackets and to the ends of said spring to permit movement of the spring longitudinally of the frame, for the purpose set forth.

4. In a vehicle of the class described, the combination with a differential axle, a housing for the axle and a longitudinal frame member, of a driving gear wheel secured on the end of said axle, a sleeve rotatably mounted on the housing, a flange on the end of said sleeve, a plurality of bearing pins in said flange, gear wheels mounted on said pins and meshing with the driving gear wheel, a ground wheel having a hub that fits over said sleeve, an internally geared ring fixed concentrically to said hub and meshing with said pinions, a brace member for preventing movement of the axle longitudinally of the frame, a suspending member fixed to the sleeve, a spring pivotally suspended by said member beneath the axle and connecting members for supporting the frame from the spring and permitting the spring supporting member to swing rearwardly or forwardly from vertical alinement with the axle.

5. In a vehicle of the class described, the combination with a differential axle, a housing for the axle, and a longitudinal frame member, of a driving gear wheel secured on the end of said axle, a sleeve rotatably mounted on the housing, a flange on the end of said sleeve, a plurality of bearing pins in said flange, gear wheels mounted on said pins and meshing with the driving gear wheel, a ground wheel having a hub that fits over said sleeve, an internally geared ring fixed concentrically to said hub and meshing with said pinions, brackets fixed to the frame member forwardly and rearwardly of the ground wheel, an arm pivotally fixed at its opposite ends to the axle housing and to one of said brackets to retain the wheel against longitudinal movement with respect to the frame, a collar fixed on the sleeve to rotate therewith, and having arms depending therefrom, a shackle pivotally suspended from the arms, a spring centrally mounted in said shackle, with its opposite ends adjacent the frame brackets and links pivotally fixed at their opposite ends to said brackets and to the ends of said spring to permit movement of the spring longitudinally of the frame, for the purpose set forth.

Signed at Seattle, Washington, this 26th day of March, 1920.

CHARLES E. STARR.